United States Patent [19]

Shinkai et al.

[11] Patent Number: 5,104,740
[45] Date of Patent: Apr. 14, 1992

[54] ELECTROLUMINESCENT ELEMENT

[75] Inventors: Masanao Shinkai; Tohru Namiki; Hitoshi Nakada; Takeo Wakimoto; Ryuji Murayama, all of Saitama; Daisaku Matsunaga, Tokyo, all of Japan

[73] Assignees: Pioneer Electronic Corporation; Nippon Kayaku Kabushiki Kaisha, both of Tokyo, Japan

[21] Appl. No.: 481,160

[22] Filed: Feb. 20, 1990

[30] Foreign Application Priority Data

Feb. 17, 1989 [JP] Japan .................................. 1-37743
Dec. 20, 1989 [JP] Japan .................................. 1-328374

[51] Int. Cl.$^5$ ............................................. A01J 1/62
[52] U.S. Cl. .............................. 428/457; 252/301.16; 313/504; 428/690; 428/917
[58] Field of Search ................ 428/690, 917, 457; 313/504; 252/301.16

[56] References Cited

U.S. PATENT DOCUMENTS

| | | | |
|---|---|---|---|
| 4,720,432 | 1/1988 | Van Slyke et al. | 428/917 |
| 4,720,436 | 1/1988 | Ohseto et al. | 428/917 |
| 4,769,292 | 9/1988 | Tang et al. | 428/917 |
| 4,885,211 | 12/1989 | Tang et al. | 428/917 |

Primary Examiner—James J. Seidleck
Attorney, Agent, or Firm—Foley & Lardner

[57] ABSTRACT

The electroluminescent element of the present invention comprises a fluorescent substance layer containing a courmarinic or azacoumarinic derivative and a hole transport layer, both made of organic compounds and laminated on top of the other. The both layers are interposed between cathode and anode electrodes. It emits light efficiently at a high luminance upon application of a low voltage between the electrodes.

28 Claims, 1 Drawing Sheet

ELECTROLUMINESCENT ELEMENT

BACKGROUND OF THE INVENTION

1. Field of the Invention

The present invention relates to an electroluminescent element. More particularly, it is concerned with an electroluminescent element in which the luminescent material is an organic compound.

2. Description of the Prior Art

The electroluminescent element of this kind has two or three layers of organic compounds. For example, the one shown in FIG. 1 has an organic fluorescent substance thin film 3 and an organic hole transport layer 4 laminated on top of the other, which are sandwiched between a metal electrode 1 as a cathode and transparent electrode 2 as an anode. The one shown in FIG. 2 has an organic electron transport layer 5, an organic fluorescent substance thin film 3, and an organic hole transport layer 4 laminated on top the other, which are sandwiched between a metal electrode 1 and a transparent electrode 2. The organic hole transport layer 4 facilitates the injection of holes from the anode and blocks electrons, and the organic electron transport layer 5 facilitates the injection of electrons from the cathode. The transparent electrode 2 is provided with a glass substrate 6. The metal electrode 1 injects electrons whereas the transparent electrode 2 injects holes, and the recombination of the electrons and holes generates excitons which emit light as they are deactivated through radiation. This light radiates outward through the transparent electrode 2 and the grass substrate 6.

However, the conventional electroluminescent element constructed as mentioned above emits light of limited spectra. It is expected to develop various electroluminescent elements which emits various colorful lights respectively.

SUMMARY OF THE INVENTION

It is an object of the present invention to provide electroluminescent elements which permit the fluorescent substances to efficiently emit light and high luminance.

The gist of the present invention resides in an electroluminescent element of the type having a fluorescent substance layer of organic compound and a hole transport layer of organic compound which are laminated on top of the other and interposed between the cathode and anode, wherein the fluorescent substance layer comprises a fluorescent substance thin film containing a coumarinic or azacoumarinic derivative.

DESCRIPTION OF THE PREFERRED EMBODIMENT

Figure 1:
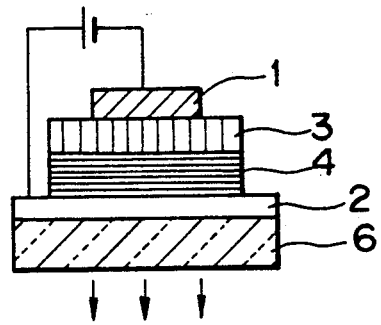
FIGS. 1 and 2 are schematic representations showing the structure of the conventional electroluminescent element.

The invention will be described in more detail with reference to an embodiment shown in FIG. 3, in which like reference characters used in FIGS. 1 and 2 designate like or corresponding parts.

The metal electrode 1 as a cathode is an aluminum thin film 1500 Å thick. The aluminum thin film may be replaced by a thin film (thicker than 500 Å) of a metal with a small work function, such as magnesium, indium, sislver and alloys thereof.

The transparent electrode 2 as an anode is a thin film (2000 Å thick) of indium tin oxide (ITO). The ITO thin film (1000 Å–3000 Å thick) may be replaced by thin film (800 Å–1500 Å thick) of a metal with a great work function, such as gold. The electrode of gold thin film is semitransparent.

Between the metal electrode 1 and the transparent electrode 2 are interposed the organic fluorescent substance thin film 7 and the organic hole transport layer 4 which are laminated on top of the other.

The organic hole transport layer 4 is a thin film (800 Å thick) of a triphenylamine derivative represented by the formula (I) below.

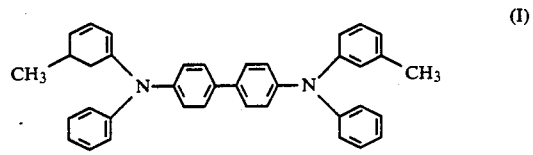

The organic hole transport layer 4 may also be made of a carrier transmitting material (CTM) represented by the following formulas (II) to (XII).

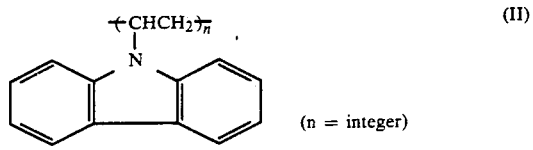

(n = integer)

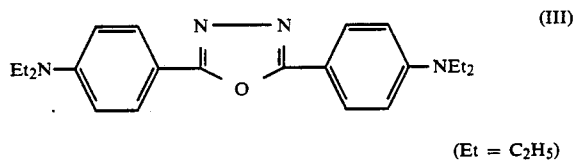

(Et = C$_2$H$_5$)

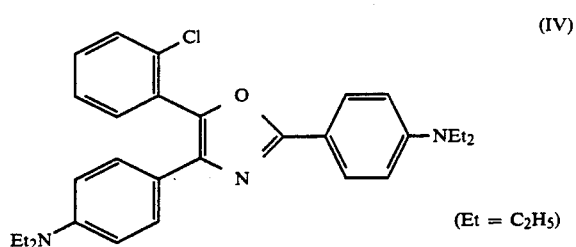

(Et = C$_2$H$_5$)

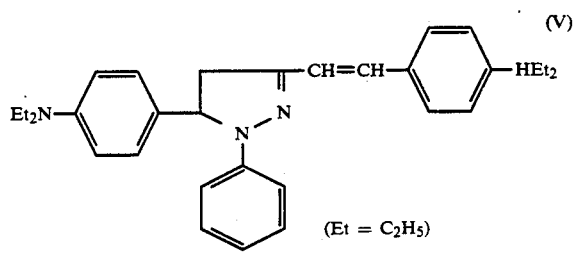

(Et = C$_2$H$_5$)

-continued

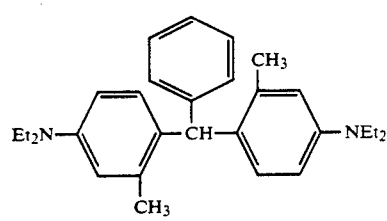
(VI)
(Et = C₂H₅)

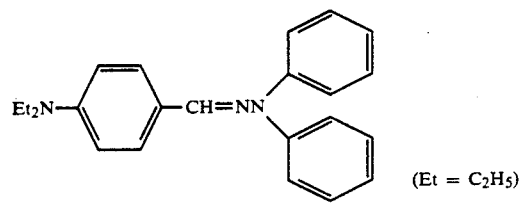
(VII)
(Et = C₂H₅)

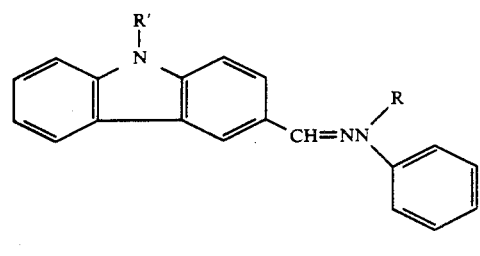
(VIII)
(R, R' = alkyl)

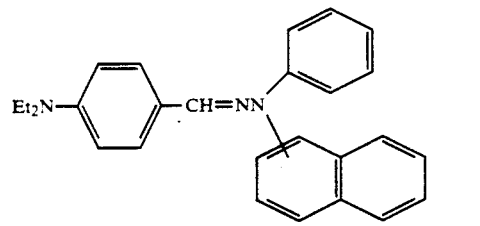
(IX)
(Et = C₂H₅)

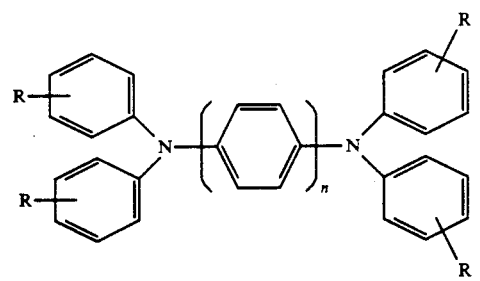
(X)
(n = integer, R = alkyl)

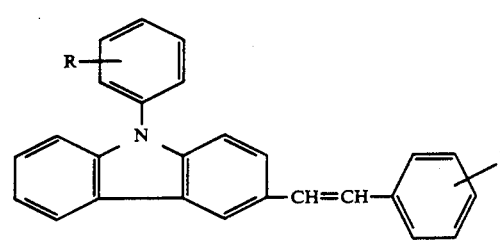
(XI)
(R = alkyl)

-continued

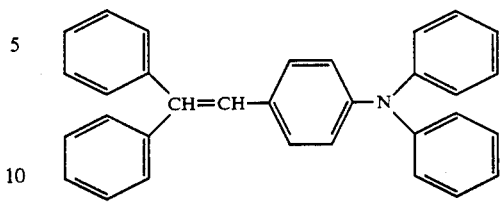
(XII)

The organic fluorescent substance thin film 7 is a thin film (800 Å thick) containing a coumarinic derivative. One of the coumarinic derivatives is known such as a dye, for example, "Basic Yellow 40" called by the CI name (Color Index name) belonging to the coumarinic dyes. The organic fluorescent substance thin film 7 should preferably be equal to or thinner than 1 μm.

This organic fluorescent substance thin film 7 contains a coumarinic derivative represented by the structural formula (A1) and (A4) below,

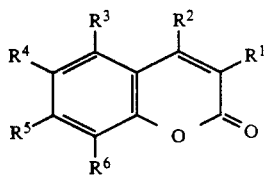
(A1)

wherein $R^1$ is selected from the group consisting of a hydrogen atom, a cyano group, a substituted or unsubstituted aryl group, an alkyl group, a carboxyl group, an acyloxy group, an aralkyl group and a heterocyclic group including one, two or three hetero atoms independently selected from oxygen atoms, sulfur atoms and nitrogen atoms, $R^2$ is selected from the group consisting of a hydrogen atom, an alkyl group, an acyloxy group, a haloalkyl group, a carboxyl group, a cyano group and an acyl group, $R^3$ is a hydrogen atom, a hydroxyl group or an allyl group, $R^4$ is a hydrogen atom, an alkyl group, an alkoxyl group, a hydroxyl group, an allyl group, an acyl group or a glycosido group, $R^5$ is selected from the group consisting of a hydrogen atom, a hydroxyl group, an alkoxyl group, an acyloxy group, an amino group, an alkylamino group, a dialkylamino group, an alkoxycarbonyl group, an alkylamino group substituted by a sulfonium group or a hydroxyl group, and an aromatic heterocyclic or five-membered ring group including two or three nitrogen atom, and $R^6$ is a hydrogen atom or an alkyl group. The possible alkyl components of these substituent groups are preferably in the range of $C_1$ to $C_5$ and may be $C_6$ or more. The possible aryl components of these substituent groups are preferably in the range of $C_6$ to $C_{14}$ and may be $C_{18}$ or more.

For example, coumarinic derivatives belonging to that of the formula (A1) preferably used for the organic fluorescent substance thin film 7 is represented by the structural formula (A1-ex2) or (A1-ex3) below.

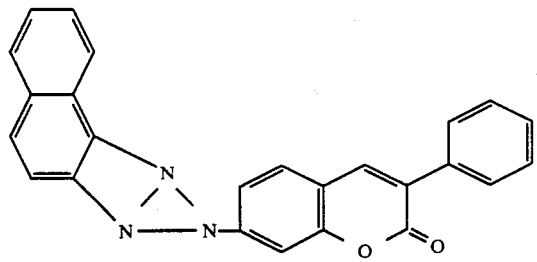
(A1-ex2)

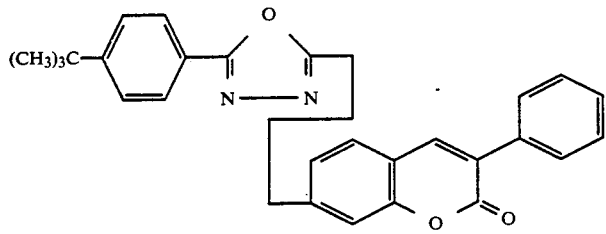
(A1-ex3)

In addition, the coumarinic derivative of the formula (A1) contained in the organic fluorescent substance thin film 7 preferably has one of the combinations of substituent groups shown in Nos. 1 to 33, No. 101 and No. 102 of Table 1. In this case, the atomic groups denoted by (1)–(19) in Tables 1, 2 and 7 are the same as atomic groups indicated by the following SUBSTITUENT TABLE respectively.

SUBSTITUENT TABLE (1) —CH$_2$N(CH$_2$COOH)$_2$ (2) 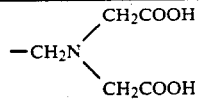

(3) 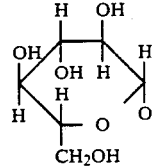

(4) 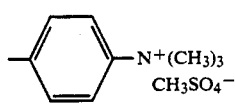

(5) 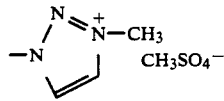

(6) —CO$_2$—CH$_2$—CH$_2$—CH$_3$

SUBSTITUENT TABLE-continued (7) 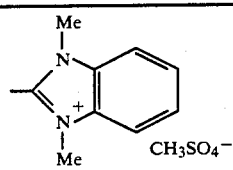

(8) 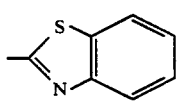

(9) 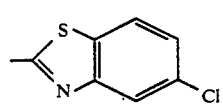

(10) 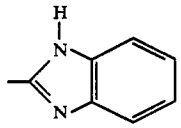

(11) 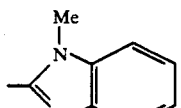

(12) 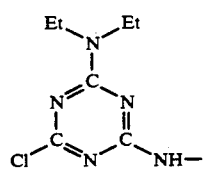

(13) 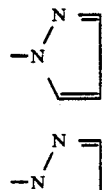

(14) 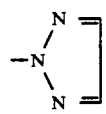

SUBSTITUENT TABLE-continued

(15) 

(16) 

(17) 

(18) 

(19) 

(Me = CH$_3$, Et = C$_2$H$_5$)

(isopropyl = CH(CH$_3$)$_2$, Ph = phenyl,

Biphenyl = biphenyl, Et = C$_2$H$_5$,

Amyl = C$_5$H$_{11}$, Allyl = CH$_2$CH=CH$_2$)

The preferred coumarinic derivative of the following formula (A1a) for the organic fluorescent substance thin film 7 is obtained when $R^3$, $R^4$ and $R^6$ are hydrogen atoms respectively in the formula (A1) above mentioned.

(A1a)

This preferred coumarinic derivative has one of the combinations of substituent groups shown in Nos. 34 to 64, and Nos. 82 to 92 of Table 2.

TABLE 1

|  | $R^1$ | $R^2$ | $R^3$ | $R^4$ | $R^5$ | $R^6$ |
|---|---|---|---|---|---|---|
| No. 1 | H | Me | OH | CH$_3$CO | H | H |
| No. 2 | H | H | H | H | OH | H |
| No. 3 | CN | H | H | H | OH | H |
| No. 4 | C$_2$H$_5$COO | H | H | H | OH | H |
| No. 5 | H | Me | H | H | OH | H |
| No. 6 | H | CF$_3$ | H | H | OH | H |
| No. 7 | CN | Me | H | H | OH | H |
| No. 8 | Ph | Me | H | H | OH | H |
| No. 9 | Isopropyl | Me | H | H | OH | H |
| No. 10 | Et | Me | H | H | OH | H |
| No. 11 | n-C$_4$H$_9$ | Me | H | H | OH | H |
| No. 12 | CH$_2$—Ph | Me | H | H | OH | H |
| No. 13 | H | Me | H | H | OH | Me |
| No. 14 | H | H | H | H | OH | (1) |
| No. 15 | H | Me | H | H | OH | (1) |
| No. 16 | H | H | H | CH$_3$O | OH | H |
| No. 17 | H | H | H | (2) | OH | H |
| No. 18 | H | Me | OH | H | OH | H |
| No. 19 | H | Me | H | OH | OH | H |
| No. 20 | Diphenyl | H | H | H | OMe | H |
| No. 21 | (3) | H | H | H | OMe | H |
| No. 22 | (4) | H | H | H | OMe | H |
| No. 23 | C$_2$H$_5$COO | H | H | H | OMe | H |
| No. 24 | H | Me | H | H | OCOMe | H |
| No. 25 | Ph | H | H | H | OCOMe | H |
| No. 26 | H | Me | Allyl | H | OCOMe | Me |
| No. 27 | (5) | Me | H | H | OCOMe | H |
| No. 28 | H | Me | H | Allyl | OCOMe | Me |
| No. 29 | Ph | H | H | H | OCOMe | H |
| No. 30 | Ph | Amyl | H | H | OCOMe | H |
| No. 31 | H | Me | H | Me | NHMe | H |
| No. 32 | H | Me | H | Me | NHEt | H |
| No. 33 | H | CF$_3$ | H | Me | NHEt | H |
| No. 101 | H | COOH | H | H | OH | H |
| No. 102 | H | OCOMe | H | H | OH | H |

TABLE 2

|  | $R^5$ | $R^1$ | $R^2$ |
|---|---|---|---|
| No. 34 | (6) | H | Me |
| No. 35 | NH$_2$ | H | H |
| No. 36 | NH$_2$ | Ph | H |
| No. 37 | NH$_2$ | H | Me |
| No. 38 | NH$_2$ | H | CF$_3$ |
| No. 39 | NH$_2$ | H | OMe |
| No. 40 | NH$_2$ | Et | Me |
| No. 41 | NHCH$_2$SO$_3$Na | H | Me |
| No. 42 | NHCH$_2$SO$_3$Na | Ph | H |
| No. 43 | NHCH$_2$CH$_2$OH | H | Me |
| No. 44 | NHEt | H | CF$_3$ |
| No. 45 | NH(CH$_2$)$_3$SO$_3$Na | H | Me |
| No. 46 | NH(CH$_2$)$_4$SO$_3$Na | H | Me |
| No. 47 | NMe$_2$ | H | H |
| No. 48 | NMe$_2$ | C$_2$H$_5$COO | H |
| No. 49 | NMe$_2$ | H | Me$_2$ |
| No. 50 | NMe$_2$ | H | CF$_3$ |
| No. 51 | NMe$_2$ | Me | OH |
| No. 52 | NEt$_2$ | H | H |
| No. 53 | NEt$_2$ | H | Me |
| No. 54 | NEt$_2$ | Et | Me |
| No. 55 | NEt$_2$ | (7) | H |
| No. 56 | NEt$_2$ | H | CF$_3$ |
| No. 57 | NEt$_2$ | (8) | H |
| No. 58 | NEt$_2$ | (9) | H |
| No. 59 | NEt$_2$ | (10) | H |
| No. 60 | NEt$_2$ | (11) | H |
| No. 61 | NMe(CH$_2$)$_4$SO$_3$Na | H | Me |
| No. 62 | N[(CH$_2$)$_3$SO$_3$Na]$_2$ | H | Me |
| No. 63 | N[(CH$_2$)$_4$SO$_3$Na]$_2$ | H | Me |
| No. 64 | (12) | Ph | H |
| No. 82 | (13)-Ph | Ph | H |
| No. 83 | (14)-PhMe | Ph | H |
| No. 84 | (14)-MeEt | (15) | H |
| No. 85 | (14)-PhMe | (15) | H |
| No. 86 | (16) | p-tolyl | H |
| No. 87 | (15) | p-tolyl | H |
| No. 88 | (15)-Me$_2$ | Ph—OCH$_3$ | H |
| No. 89 | (13)-MeCl | (17) | H |
| No. 90 | (18) | (13)-Cl | H |
| No. 91 | (14)-MeEt | (17) | H |

TABLE 2-continued

| | R⁵ | R¹ | R² |
|---|---|---|---|
| No. 92 | (17) | p-tolyl | H |

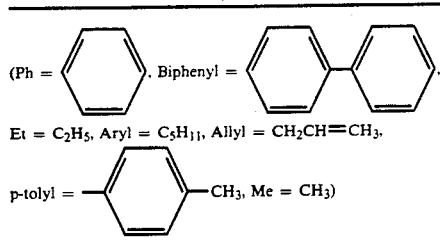

(Ph = phenyl, Biphenyl = biphenyl,
Et = C₂H₅, Aryl = C₅H₁₁, Allyl = CH₂CH=CH₂,
p-tolyl = tolyl, Me = CH₃)

In order to clarify the structures of the coumarinic derivatives having the combinations of substituent groups of Nos. 82-85 and Nos. 88-91, the general formulas of these coumarinic derivatives are shown with the corresponding numbers, as follows:

No. 82
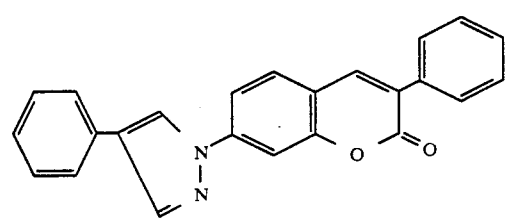

No. 83
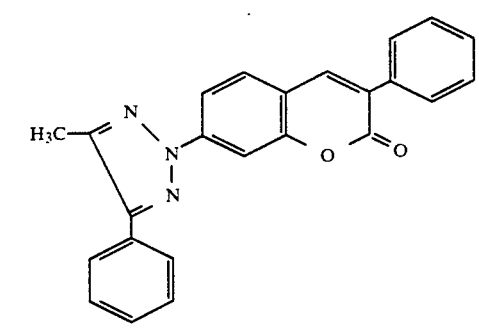

No. 84
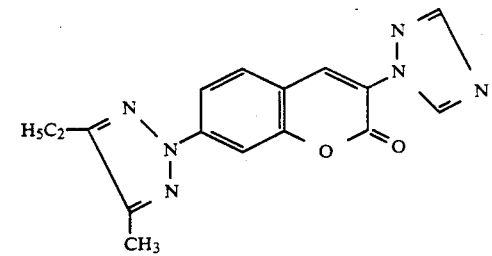

No. 85
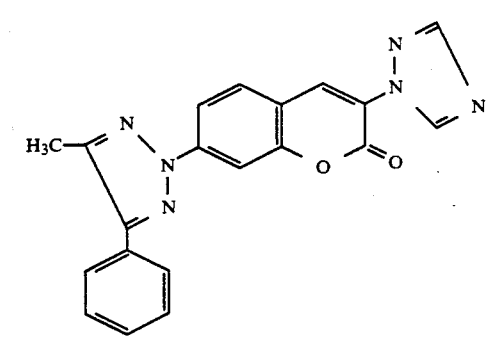

No. 88
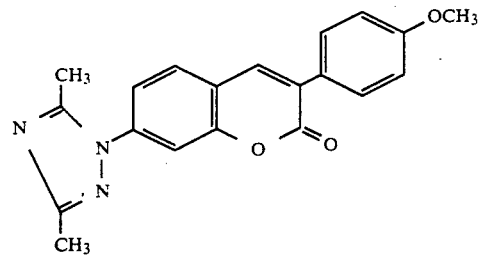

No. 89
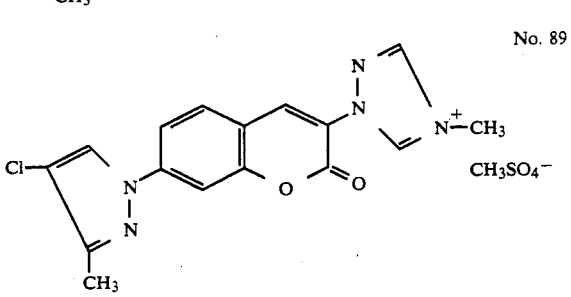

No. 90
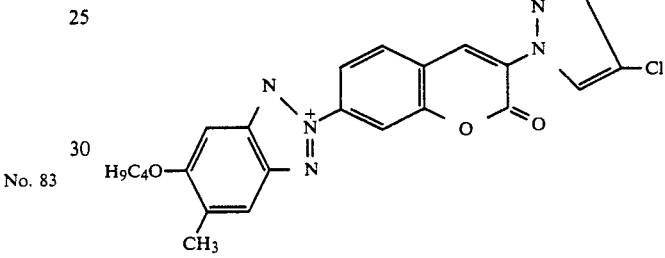

No. 91
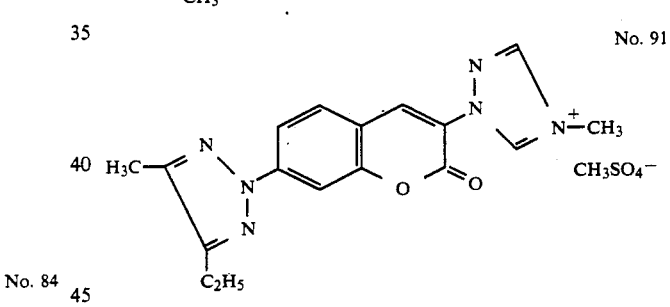

In another embodiment, the organic fluorescent substance thin film 7 contains a coumarinic derivative represented by the structural formula (A1) above mentioned, wherein R¹ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms, R² is selected from the group consisting of a hydrogen atom, an alkyl group, an acyloxy group, a haloalkyl group, a carboxyl group, a cyano group and an acyl group, R³ is a hydrogen atom, a hydroxyl group or an allyl group, R⁴ and R⁵ form a condensed ring together when R⁵ is an amino group, and R⁶ is a hydrogen atom or an alkyl group. The possible alkyl components of these substituent groups are preferably in the range of C₁ to C₅ and may be C₆ or more. The possible aryl components of these substituent groups are preferably in the range of C₆ to C₁₄ and may be C₁₈ or more. In this case, the coumarinic derivative is preferably a compound represented by the following formula (A1b).

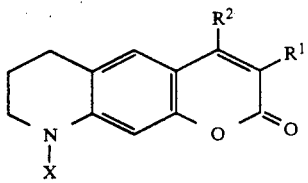

(A1b)

Particularly, the coumarinic derivative of the formula (A1b) contained in the organic fluorescent substance thin film 7 preferably has one of the combinations of substituent groups shown in Nos. 65 to 71 of Table 3.

TABLE 3

|  | X | $R^1$ | $R^2$ |
|---|---|---|---|
| No. 65 | H | H | H |
| No. 66 | Me | H | H |
| No. 67 | H | H | $CF_3$ |
| No. 68 | Me | H | $CF_3$ |
| No. 69 | Et | H | $CF_3$ |
| No. 70 | $(CH_2)_3SO_3Na$ | H | Me |
| No. 71 | $(CH_2)_4SO_3Na$ | H | Me |

(Me = $CH_3$, Et = $C_2H_5$)

In further another embodiment, the organic fluorescent substance thin film 7 contains a coumarinic derivative represented by the structural formula (A1) above mentioned, wherein $R^1$ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms, $R^2$ is selected from the group consisting of a hydrogen atom, an alkyl group, an acyloxy group, a haloalkyl group, a carboxyl group, a cyano group and an acyl group, $R^3$ is a hydrogen atom, a hydroxyl group or an allyl group, $R^4$ is a hydrogen atom, an alkyl group, an alkoxyl group, a hydroxyl group, an allyl group or an acyl group, and $R^5$ and $R^6$ form a condensed ring together when $R^5$ is an amino group. The possible alkyl components of these substituent groups are preferably in the range of $C_1$ to $C_5$ and may be $C_6$ or more. The possible aryl components of these substituent groups are preferably in the range of $C_6$ to $C_{14}$ and may be $C_{18}$ or more. In this case, the coumarinic derivative is preferably a compound represented by the following formula (A1c).

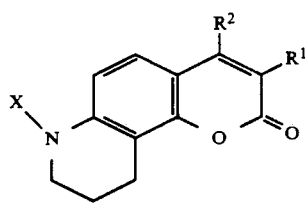

(A1c)

Particularly, the coumarinic derivative of the formula (A1c) contained in the organic fluorescent substance thin film 7 preferably has one of the combinations of substituent groups shown in Nos. 72 and 73 of Table 4.

TABLE 4

|  | X | $R^1$ | $R^2$ |
|---|---|---|---|
| No. 72 | H | H | $CF_3$ |

TABLE 4-continued

|  | X | $R^1$ | $R^2$ |
|---|---|---|---|
| No. 73 | Me | H | $CF_3$ |

(Me = $CH_3$)

In another embodiment, the organic fluorescent substance thin film 7 contains a coumarinic derivative represented by the structural formula (A1) above mentioned, wherein $R^1$ is selected from the group consisting of a hydrogen atom, a cyano group, a substituted or unsubstituted aryl group, an alkyl group, a carboxyl group, an acyloxy group, an allyloxycarbonyl group, an acyl group and a heterocyclic group including one, two or three hetero atoms independently selected from oxygen atoms, sulfur atoms and nitrogen atoms, $R^2$ is selected from the group consisting of a hydrogen atom, an alkyl group, an acyloxy group, a haloalkyl group, a carboxyl group, a cyano group and an acyl group, $R^3$ is a hydrogen atom, hydroxyl group or allyl group, and $R^4$, $R^5$ and $R^6$ form a condensed ring together when $R^5$ is an amino group. The possible alkyl components of these substituent groups are preferably in the range of $C_1$ to $C_5$ and may be $C_6$ or more. The possible aryl components of these substituent groups are preferably in the range of $C_6$ to $C_{14}$ and may be $C_{18}$ or more. In this case, the coumarinic derivative is preferably a compound represented by the following formula (A1d).

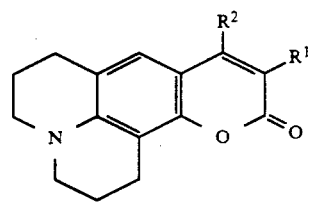

(A1d)

For example, the organic fluorescent substance thin film 7 preferably contains a coumarinic derivative belonging to that of the formula (A1) represented by the structural formula (A1d-ex5) below.

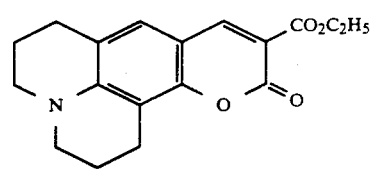

(A1d-ex5)

Particularly, the coumarinic derivative of the formula (A1d) contained in the organic fluorescent substance thin film 7 preferably has one of the combinations of substituent groups shown in Nos. 74 and 81 of Table 5.

TABLE 5

|  | $R^1$ | $R^2$ |
|---|---|---|
| No. 74 | H | H |
| No. 75 | H | Me |
| No. 76 | H | $CF_3$ |
| No. 77 | COMe | H |
| No. 78 | CN | H |
| No. 79 | COOH | H |
| No. 80 | $C_2H_5COO$ | H |
| No. 81 | Me | H |

(Me = $CH_3$)

In further another embodiment, the organic fluorescent substance thin film 7 contains a coumarinic derivative represented by the structural formula (A1) above mentioned, wherein $R^1$ and $R^2$ form a condensed ring together, $R^3$ is a hydrogen atom, a hydroxyl group or an allyl group, $R^4$ is a hydrogen atom, an alkyl group, an alkoxyl group, a hydroxyl group, an allyl group or an acyl group, $R^5$ is selected from the group consisting of a hydrogen atom, a hydroxyl group, an alkoxyl group, an acyloxy group, an amino group, an alkylamino group, a dialkylamino group, an alkyl group unsubstituted or substituted by a sulfonium group, and an aromatic heterocyclic or five-membered ring group including two or three nitrogen atoms, and $R^6$ is a hydrogen atom or an alkyl group. The possible alkyl components of these substituent groups are preferably in the range of $C_1$ to $C_5$ and may be $C_6$ or more. For example, the organic fluorescent substance thin film 7 preferably contains a coumarinic derivative represented by the structural formula (A1e-97) below.

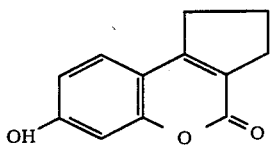

(A1e-97)

In another embodiment, the organic fluorescent substance thin film 7 contains a coumarinic derivative represented by the structural formula (A1) above mentioned, wherein $R^1$ and $R^2$ form a condensed ring together, $R^3$ is a hydrogen atom, a hydroxyl group or an allyl group, and $R^4$, $R^5$ and $R^6$ form a condensed ring together when $R^5$ is an amino group. The possible alkyl components of these substituent groups are preferably in the range of $C_1$ to $C_5$ and may be $C_6$ or more. For example, the organic fluorescent substance thin film 7 preferably contains a coumarinic derivative represented by the structural formula (A1e-98) below.

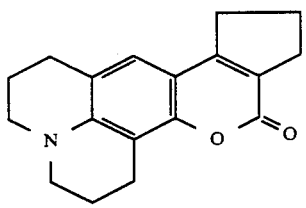

(A1e-98)

In another embodiment, the organic fluorescent substance thin film 7 contains a coumarinic derivative represented by the structural formula (A1) above mentioned, wherein $R^1$ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms, $R^2$ is selected from the group consisting of a hydrogen atom, an alkyl group, an acyloxy group, a haloalkyl group, a carboxyl group, a cyano group and an acyl group, $R^3$ and $R^4$ form a condensed ring together, $R^5$ is selected from the group consisting of a hydrogen atom, a hydroxyl group, an alkoxyl group, an acyloxy group, an amino group, an alkylamino group, a dialkylamino group, an alkyl group unsubstituted or substituted by a sulfonium group, and an aromatic heterocyclic or five-membered ring group including two or three nitrogen atoms, and $R^6$ is a hydrogen atom or an alkyl group. The possible alkyl components of these substituent groups are preferably in the range of $C_1$ to $C_5$ and may be $C_6$ or more. The possible aryl components of these substituent groups are preferably in the range of $C_6$ to $C_{14}$ and may be $C_{18}$ or more. For example, the organic fluorescent substance thin film 7 preferably contains a coumarinic derivative represented by the structural formula (A1f-ex4) below.

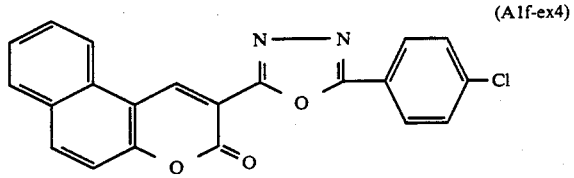

(A1f-ex4)

In further another embodiment, the organic fluorescent substance thin film 7 contains an azacoumarinic derivative is represented by the structural formula (A2) below,

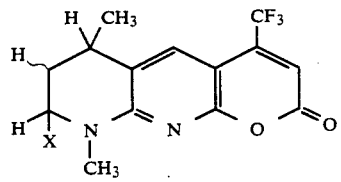

(A2)

wherein X is a hydrogen atom or an alkyl group. The possible alkyl components of these substituent groups are preferably in the range of $C_1$ to $C_5$ and may be $C_6$ or more.

Particularly, the azacoumarinic derivative of the formula (A2) contained in the organic fluorescent substance thin film 7 preferably has one of the combinations of substituent groups shown in Nos. 99 and 100 of Table 6.

TABLE 6

| | X |
| --- | --- |
| No. 99 | H |
| No. 100 | Me |

(Me = $CH_3$)

In further another embodiment, the organic fluorescent substance thin film 7 contains an azacoumarinic derivative is represented by the structural formula (A3) below,

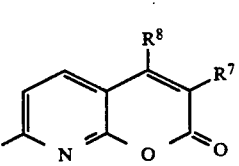

(A3)

wherein $R^7$ is a hydrogen atom, an alkyl group or a cyano group, $R^8$ is an alkyl group or a cyano group, X is selected from the group consisting of a hydroxyl group, an amino group, an alkylamino group, a dialkylamino group, and an aromatic heterocyclic or six-membered ring group including one oxygen atom and one nitrogen atom. The possible alkyl components of these substituent groups are preferably in the range of $C_1$ to $C_5$ and may be $C_6$ or more.

Figure 2:
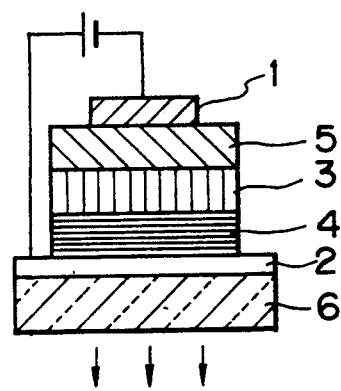
Figure 3:
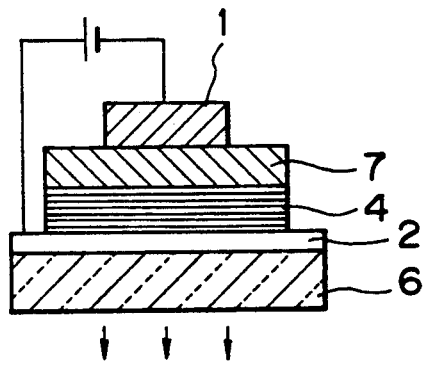
FIG. 3 is a schematic representation showing the structure of an embodiment of the present invention.

Particularly, the azacoumarinic derivative of the formula (A2) contained in the organic fluorescent substance thin film 7 preferably has one of the combinations of substituent groups shown in Nos. 93 and 96 of Table 7.

two-layer structure may be replaced by the three-layer structure as shown in FIG. 2 to produce the same effect. In the latter case, an additional organic electron transport layer 5 is interposed between the cathode 1 and the fluorescent substance thin film 7. The layer 5 may be made of a perylene tetracarboxyl derivative represented by the formula (XX) below.

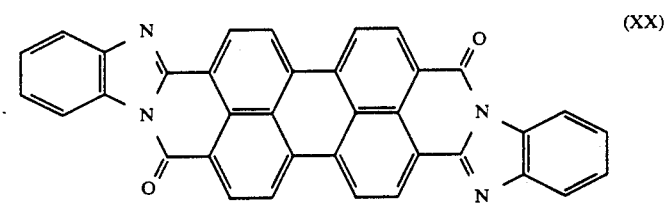
(XX)

TABLE 7

| | X | $R^7$ | $R^8$ |
|---|---|---|---|
| No. 93 | OH | H | Me |
| No. 94 | $NH_2$ | Me | Me |
| No. 95 | $NMe_2$ | H | Me |
| No. 96 | (19) | H | Me |

(Me = $CH_3$)

In further another embodiment, the organic fluorescent substance thin film 7 contains a coumarinic derivative is represented by the structural formula (A4) below,

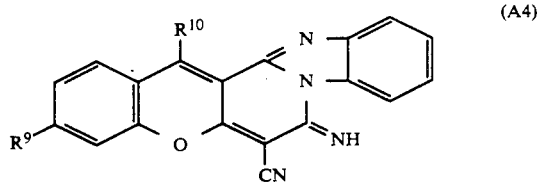
(A4)

wherein $R^9$ is selected from the group consisting of a hydrogen atom, a hydroxyl group, an alkoxyl group, an alkoxycarbonyl group, an amino group, an alkylamino group, a dialkylamino group and an alkyl group unsubstituted or substituted by a sulfonium group, and $R^{10}$ is a hydrogen atom or a cyano group. The possible alkyl components of these substituent groups are preferably in the range of $C_1$ to $C_5$ and may be $C_6$ or more. For example, the organic fluorescent substance thin film 7 preferably contains an azacoumarinic derivative represented by the structural formula (A4-ex1) below.

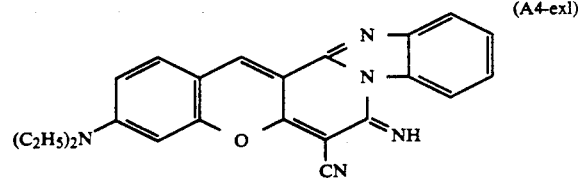
(A4-ex1)

The electroluminescent element in the above-mentioned embodiments are of two-layer structure (in which the organic fluorescent substance thin film 7 and the organic hole transport layer 4 are interposed between the electrode 1 and the anode 2). However, the As mentioned above, the electroluminescent element of the present invention is constructed such that a fluorescent substance layer and a hole transport layer, both made of organic compounds and laminated on top of the other, are interposed between a cathode and an anode. The fluorescent substance layer is a thin film containing a coumarinic derivative or azacoumarinic derivative. It emits light efficiently at a high luminance upon application of a low voltage.

EXAMPLES

Six examples of electroluminescent elements according to the present invention were manufactured and tested about the electroluminescent element properties.

In each examples, the transparent electrode as an anode of ITO was deposited and formed on a glass plate at a thick of 2000 Å. The metal cathode was made of an aluminum thin film 1500 Å thick.

The organic hole transport layer was made of a triphenylamine derivative represented by the formula (I) mentioned above.

The fluorescent substance layer of organic compound of the Example 1 was made of a coumarinic derivative of "Basic Yellow 40" which has the combination of atomic groups shown in No. 55 in Table 2, represented by the structural formula (A1a-55) below.

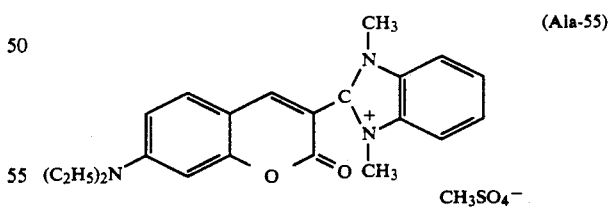
(A1a-55)

The fluorescent substance layers of organic compound of the Examples 2 to 6 were respectively made of coumarinic derivatives represented by the structural formulas (A4-ex1), (A1-ex2), (A1-ex3), (A1f-ex4) and (A1d-ex5) mentioned above.

The thin-layer-forming conditions for these laminated layers of the six examples in a vacuum deposition device are shown in Table 8 together with the properties of emission of light in the electroluminescent elements of the examples obtained under these conditions.

TABLE 8

| | | thin-layer-forming conditions | | | emission of light | |
|---|---|---|---|---|---|---|
| | | | deposition | | | |
| | | pressure (Torr) | rate (Å/sec.) | thickness (Å) | wavelength (nm) | luminance (cd/m²) |
| example 1 | H.T.L. | $2 \times 10^{-6}$ | 3.0 | 800 | 530 | 1,651 |
| | F.S.L. | $2 \times 10^{-6}$ | 3.4 | 1000 | | (applied |
| | cathode (Al) | $2 \times 10^{-6}$ | 10.5 | 1500 | | voltage 22 V) |
| example 2 | H.T.L. | $8 \times 10^{-6}$ | 3.7 | 800 | 600 ~ | 12 |
| | F.S.L. | $8 \times 10^{-6}$ | 3.3 | 800 | 700 | |
| | cathode (Al) | $8 \times 10^{-6}$ | 8.1 | 1500 | (red) | |
| example 3 | H.T.L. | $8 \times 10^{-6}$ | 3.4 | 600 | 580 | 120 |
| | F.S.L. | $8 \times 10^{-6}$ | 3.2 | 1000 | | |
| | cathode (Al) | $8 \times 10^{-6}$ | 9.8 | 1500 | | |
| example 4 | H.T.L. | $8 \times 10^{-6}$ | 3.3 | 600 | 590 | 39 |
| | F.S.L. | $8 \times 10^{-6}$ | 3.0 | 700 | | |
| | cathode (Al) | $8 \times 10^{-6}$ | 10.2 | 1500 | | |
| example 5 | H.T.L. | $8 \times 10^{-6}$ | 3.8 | 800 | 605 | 55 |
| | F.S.L. | $8 \times 10^{-6}$ | 3.6 | 1000 | | |
| | cathode (Al) | $8 \times 10^{-6}$ | 10.1 | 1500 | | |
| example 6 | H.T.L. | $8 \times 10^{-6}$ | 3.7 | 800 | (orange) | 37 |
| | F.S.L. | $8 \times 10^{-6}$ | 3.3 | 1000 | | |
| | cathode (Al) | $8 \times 10^{-6}$ | 10.8 | 1500 | | |

(H.T.L. = hole transport layer, F.S.L. = fluorescent substance layer)

What is claimed is:

1. An electroluminescent element comprising a cathode, a fluorescent substance layer of organic compound, a hole transport layer of organic compound and an anode which are laminated in sequence, wherein the fluorescent substance layer predominantly comprises a coumarinic derivative that emits light efficiently at a high luminance upon application of a low voltage.

2. An electroluminescent element as claimed in claim 1, in which said coumarinic derivative is represented by the structural formula (A1) below,

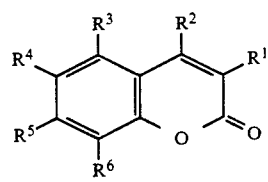

(A1)

wherein
R¹ is selected from the group consisting of a hydrogen atom, a cyano group, a substituted or unsubstituted aryl group, an alkyl group, a carboxyl group, an acyloxy group, an aralkyl group and a heterocyclic group including one, two or three hetero atoms independently selected from oxygen atoms, sulfur atoms and nitrogen atoms, R² is selected from the group consisting of a hydrogen atom, an alkyl group, an acyloxy group, a haloalkyl group, a carboxyl group, a cyano group and an acyl group, R³ is a hydrogen atom, a hydroxyl group or an allyl group, R⁴ is a hydrogen atom, an alkyl group, an alkoxyl group, a hydroxyl group, an allyl group, an acyl group or a glycosido group, R⁵ is selected from the group consisting of a hydrogen atom, a hydroxyl group, an alkoxyl group, an acyloxy group, an amino group, an alkylamino group, a dialkylamino group, an alkoxycarbonyl group, an alkylamino group substituted by a sulfonium group or a hydroxyl group, and an aromatic heterocyclic or five-membered ring group including two or three nitrogen atoms, and R⁶ is a hydrogen atom or an alkyl group.

3. An electroluminescent element as claimed in claim 2, in which said coumarinic derivative is represented by the structural formula (A1a-55) below,

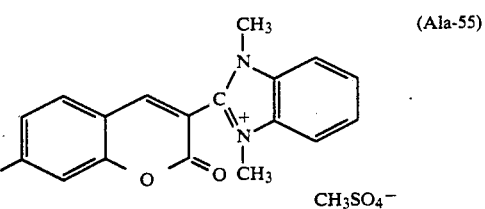

(A1a-55)

4. An electroluminescent element as claimed in claim 2, in which said coumarinic derivative is represented by the structural formula (A1-ex2) below,

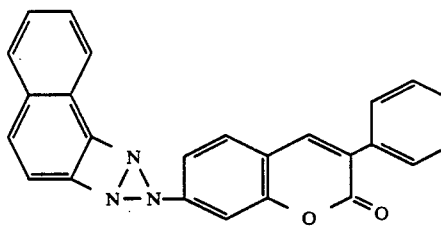

(A1-ex2)

5. An electroluminescent element as claimed in claim 2, in which said coumarinic derivative is represented by the structural formula (A1-ex3) below,

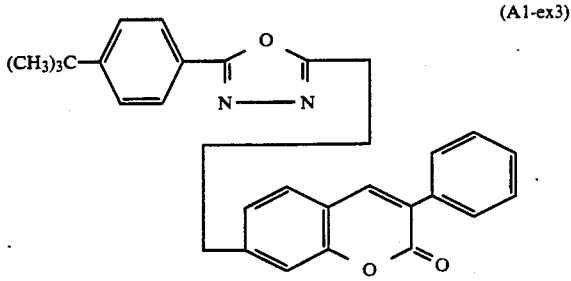

(A1-ex3)

6. An electroluminescent element as claimed in claim 3, in which said organic hole transport layer is made of a triphenylamine derivative represented by the formula (I) below,

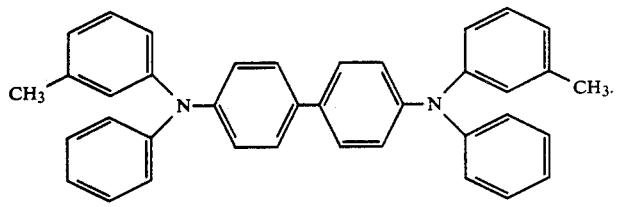

7. An electroluminescent element as claimed in claim 1, in which said coumarinic derivative is represented by the structural formula (A1) below,

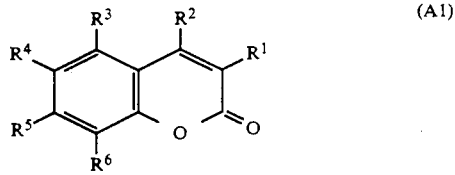

wherein
- $R^1$ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms,
- $R^2$ is selected from the group consisting of a hydrogen atom, an alkyl group, an acyloxy groups, a haloalkyl group, a carboxyl group, a cyano group and an acyl group,
- $R^3$ is a hydrogen atom, a hydroxyl group or an allyl group,
- $R^4$ and $R^5$ form a condensed ring together when $R^5$ is an amino group, and
- $R^6$ is a hydrogen atom or an alkyl group.

8. An electroluminescent element as claimed in claim 1, in which said coumarinic derivative is represented by the structural formula (A1) below, wherein
- $R^1$ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms,
- $R^2$ is selected from the group consisting of a hydrogen atom, an alkyl group, an acyloxy group, a haloalkyl group, a carboxyl group, a cyano group and an acyl group,
- $R^3$ is a hydrogen atom, a hydroxyl group or an allyl group,
- $R^4$ is a hydrogen atom, an alkyl group, an alkoxyl group, a hydroxyl group, an allyl group or an acyl group, and
- $R^5$ and $R^6$ form a condensed ring together when $R^5$ is an amino group.

9. An electroluminescent element as claimed in claim 1, in which said coumarinic derivative is represented by the structural formula (A1) below,

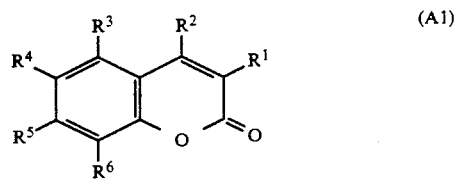

wherein
- $R^1$ is selected from the group consisting of a hydrogen atom, a cyano group, a substituted or unsubstituted aryl group, an alkyl group, a carboxyl group, an acyloxy group, an allyloxycarbonyl group, an acyl group and a heterocyclic group including one, two or three hetero atoms independently selected from oxygen atoms, sulfur atoms and nitrogen atoms,
- $R^2$ is selected from the group consisting of a hydrogen atom, an alkyl group, an acyloxy group, a haloalkyl group, a carboxyl group, a cyano group and an acyl group,
- $R^3$ is a hydrogen atom, hydroxyl group or allyl group, and
- $R^4$, $R^5$ and $R^6$ form a condensed ring together when $R^5$ is an amino group.

10. An electroluminescent element as claimed in claim 9, in which said coumarinic derivative is represented by the structural formula (A1d-ex5) below,

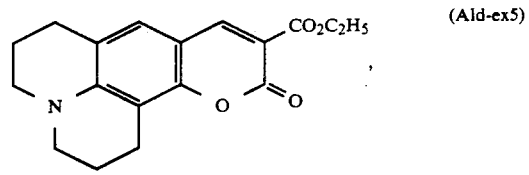

11. An electroluminescent element as claimed in claim 10, in which said organic hole transport layer is made of a triphenylamine derivative represented by the formula (I) below,

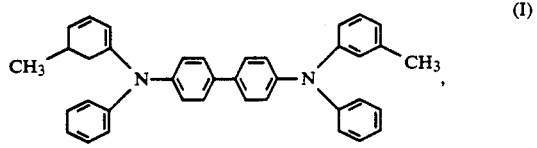

12. An electroluminescent element as claimed in claim 1, in which said coumarinic derivative is represented by the structural formula (A1) below,

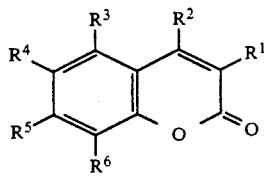

wherein

R¹ and R² form a condensed ring together

R³ is a hydrogen atom, a hydroxyl group or an allyl group,

R⁴ is a hydrogen atom, an alkyl group, an alkoxyl group, a hydroxyl group, an allyl group or an acyl group, R⁵ is selected from the group consisting of a hydrogen atom, a hydroxyl group, an alkoxyl group, an acyloxy group, an amino group, an alkylamino group, a dialkylamino group, an alkyl group unsubstituted or substituted by a sulfonium group, and an aromatic heterocyclic or five-membered ring group including two or three nitrogen atoms, and R⁶ is a hydrogen atom or an alkyl group.

13. An electroluminescent element as claimed in claim 1, in which said coumarinic derivative is represented by the structural formula (A1) below,

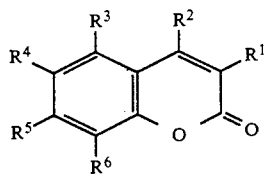

wherein

R¹ and R² form a condensed ring together,

R³ is a hydrogen atom, a hydroxyl group or an allyl

R⁴, R⁵ and R⁶ form a condensed ring together when R⁵ is an amino group.

14. An electroluminescent element as claimed in claim 1, in which said coumarinic derivative is represented by the structural formula (A1) below,

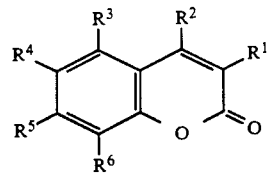

wherein

R¹ is selected from the group consisting of a hydrogen atom, a cyano group, a substituted or unsubstituted aryl group, an alkyl group, a carboxyl group, an acyloxy group and a heterocyclic group including one, two or three hetero atoms independently selected from oxygen atoms, sulfur atoms and nitrogen atoms, R² is selected from the group consisting of a hydrogen atom, an alkyl group, an acyloxy group, a haloalkyl group, a carboxyl group, a cyano group and an acyl group, R³ and R⁴ form a condensed ring together, R⁵ is selected from the group consisting of a hydrogen atom, a hydroxyl group, an alkoxyl group, an hydrogen atom, a hydroxyl group, an alkoxyl group, an acyloxy group, an amino group, an alkylamino group, a dialkylamino group, an alkyl group unsubstituted or substituted by a sulfonium group, and an aromatic heterocyclic or five-membered ring group including two or three nitrogen atoms, and R⁶ is a hydrogen atom or an alkyl group.

15. An electroluminescent element as claimed in claim 14, in which said coumarinic derivative is represented by the structural formula (A1f-ex4) below,

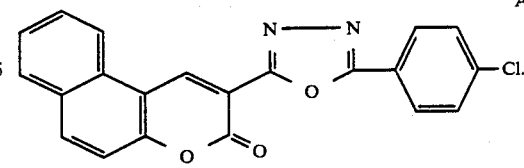

16. An electroluminescent element as claimed in claim 15, in which said organic hole transport layer is made of a triphenylamine derivative represented by the formula (I) below,

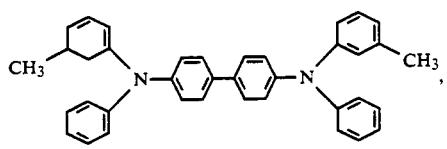

17. An electroluminescent element as claimed in claim 1, in which said coumarinic derivative is

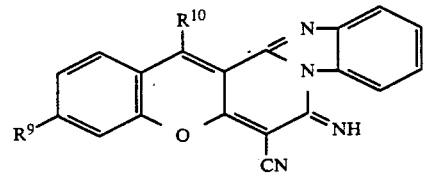

wherein

R⁹ is selected from the group consisting of a hydrogen atom, a hydroxyl group, an alkoxyl group, an alkoxycarbonyl group, an amino group, an alkylamino group, a dialkylamino group and an alkyl group unsubstituted or substituted by a sulfonium group, and R¹⁰ is a hydrogen atom or a cyano group.

18. An electroluminescent element as claimed in claim 17, in which said coumarinic derivative is represented by the structural formula (A4-ex1) below,

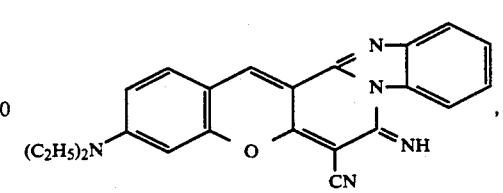

19. An electroluminescent element as claimed in claim 18, in which said organic hole transport layer is made of a triphenylamine derivative represented by the formula (I) below,

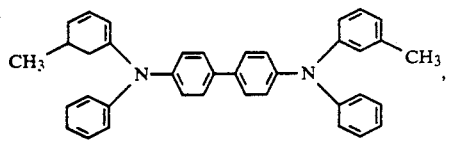 (I)

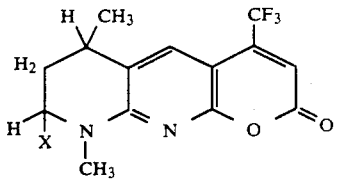 (A2)

20. An electroluminescent element as claimed in claim 1, which further comprises an organic electron transport layer interposed between said cathode and said fluorescent substance layer.

21. An electroluminescent element as claimed in claim 1, wherein the fluorescent substance consists essentially of the coumarinic derivative.

22. An electroluminescent element as claimed in claim 1, wherein the fluorescent substance consists of the coumarinic derivative.

23. An electroluminescent element comprising a cathode, a fluorescent substance layer of organic compound, a hole transport layer of organic compound and an anode which are laminated in sequence, wherein the fluorescent substance layer predominantly comprises a azocoumarinic derivative that emits light efficiently at a high luminance upon application of a low voltage.

24. An electroluminescent element as claimed in claim 23, in which said azacoumarinic derivative is represented by the structural formula (A2) below, wherein X is a hydrogen atom or an alkyl group.

25. An electroluminescent element as claimed in claim 23, in which said azacoumarinic derivative is represented by the structural formula (A3) below,

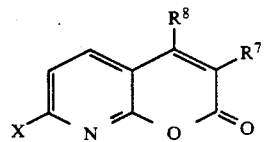 (A3)

wherein
R$^7$ is a hydrogen atom, an alkyl group or a cyano group,
R$^8$ is an alkyl group or a cyano group, and
X is selected from the group consisting of a hydroxyl group, an amino group, an alkylamino group, a dialkylamino group, and an aromatic heterocyclic or six-membered ring group including one oxygen atom and one nitrogen atom.

26. An electroluminescent element as claimed in claim 23, which further comprises an organic electron transport layer interposed between said cathode and said fluorescent substance layer.

27. An electroluminescent element as claimed in claim 23, wherein the fluorescent substance consists essentially of the coumarinic derivative.

28. An electroluminescent element as claimed in claim 23, wherein the fluorescent substance consists of the coumarinic derivative.

* * * * *